United States Patent
Jarrett et al.

(10) Patent No.: US 9,858,415 B2
(45) Date of Patent: Jan. 2, 2018

(54) CLOUD MALWARE FALSE POSITIVE RECOVERY

(75) Inventors: Michael Jarrett, Kirkland, WA (US);
Vishal Kapoor, Seattle, WA (US);
Charles Turner, Bothel, WA (US);
Joseph Johnson, Seattle, WA (US);
Jason J. Joyce, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 584 days.

(21) Appl. No.: 13/162,211

(22) Filed: Jun. 16, 2011

(65) Prior Publication Data

US 2012/0324579 A1    Dec. 20, 2012

(51) Int. Cl.
*G06F 21/56*    (2013.01)
*G06F 21/55*    (2013.01)

(52) U.S. Cl.
CPC .......... *G06F 21/564* (2013.01); *G06F 21/552* (2013.01)

(58) Field of Classification Search
CPC .......... G06F 21/00; G06F 21/50; G06F 21/55; G06F 21/552; G06F 21/56; G06F 21/561; G06F 21/562; G06F 21/564; G06F 21/566; G06F 21/568; H04L 63/14; H04L 63/1408; H04L 63/1416; H04L 63/1441; H04L 63/145; H04L 63/20
See application file for complete search history.

(56) References Cited

U.S. PATENT DOCUMENTS

| 7,640,589 B1 | 12/2009 | Mashevsky et al. | |
| 7,716,743 B2 | 5/2010 | Costea et al. | |
| 8,312,537 B1 * | 11/2012 | Nachenberg et al. | 726/22 |
| 8,336,100 B1 * | 12/2012 | Glick et al. | 726/23 |
| 8,671,449 B1 * | 3/2014 | Nachenberg | 726/24 |
| 2004/0083384 A1 * | 4/2004 | Hypponen | 713/200 |
| 2006/0168057 A1 * | 7/2006 | Warren et al. | 709/206 |
| 2006/0174344 A1 * | 8/2006 | Costea et al. | 726/24 |
| 2006/0195904 A1 * | 8/2006 | Williams | 726/24 |
| 2007/0028291 A1 * | 2/2007 | Brennan et al. | 726/1 |
| 2007/0220607 A1 * | 9/2007 | Sprosts et al. | 726/24 |
| 2009/0064329 A1 * | 3/2009 | Okumura et al. | 726/22 |
| 2009/0100520 A1 * | 4/2009 | Reasor et al. | 726/23 |

(Continued)

OTHER PUBLICATIONS

McAfee, McAfee VirusScan Enterprise 8.8. software Product Guide, 2010, McAfee, pp. 1-166.*

(Continued)

*Primary Examiner* — Robert Leung
*Assistant Examiner* — Adrian Stoica
(74) *Attorney, Agent, or Firm* — Fiala & Weaver P.L.L.C.

(57) ABSTRACT

Methods, systems, and computer program products are provided for recovering from false positives of malware detection. Malware signatures that are defective may be causing false positives during software scanning for malware. Such defective malware signatures may be detected (e.g., by user feedback, etc.) and revoked. Computers that are using the malware signatures to detect malware may be notified of the revoked signatures, and may be enabled to re-scan content identified as containing malware using malware signatures that do not include the revoked malware signatures. As such, if the content is determined during the re-scan to not be infected, the content may be re-enabled for usage on the computer (e.g., may be restored from quarantine storage).

20 Claims, 6 Drawing Sheets

(56) References Cited

U.S. PATENT DOCUMENTS

| | | | | |
|---|---|---|---|---|
| 2009/0138972 A1* | 5/2009 | Scales | .................. | 726/24 |
| 2009/0158432 A1* | 6/2009 | Zheng et al. | .................. | 726/24 |
| 2009/0199297 A1 | 8/2009 | Jarrett et al. | | |
| 2009/0216841 A1* | 8/2009 | Choi et al. | .................. | 709/206 |
| 2009/0319629 A1* | 12/2009 | de Guerre et al. | .......... | 709/206 |
| 2009/0320133 A1* | 12/2009 | Viljoen et al. | ................ | 726/24 |
| 2009/0328221 A1* | 12/2009 | Blumfield et al. | ............. | 726/24 |
| 2010/0011071 A1* | 1/2010 | Zheleva | .................. | 709/206 |
| 2010/0115040 A1* | 5/2010 | Sargent et al. | ............. | 709/206 |
| 2011/0047620 A1* | 2/2011 | Mahaffey et al. | ............. | 726/23 |

OTHER PUBLICATIONS

Paleari, et al., "Automatic Generation of Remediation Procedures for Malware Infections", Retrieved at <<http://www.usenix.org/events/sec10/tech/full_papers/Paleari.pdf>>, Proceedings of the 19th USENIX conference on Security, 2010, pp. 1-16.

Li, et al., "AGIS: Towards Automatic Generation of Infection Signatures", Retrieved at <<http://vx.netlux.org/lib/pdf/AGIS: Towards Automatic Generation of Infection Signatures.pdf>>, Proceedings of IEEE International Conference on Dependable Systems and Networks With FTCS and DCC DSN, Jun. 24, 2008, pp. 12.

Yan, et al., "Toward Automatic Discovery of Malware Signature for Anti-virus Cloud Computing", Retrieved at <<https://imperia.trendmicro-europe.com/imperia/md/content/us/pdf/threats/securitylibrary/weiyan-09-whitepaper.pdf>>, Lecture Notes of the Institute for Computer Sciences, Social Informatics and Telecommunications Engineering, vol. 4, Jun. 26, 2009, pp. 5.

* cited by examiner

FIG. 1

202 transmit a malware signature scan set and a signature identifier list to a plurality of clients

402 — scan content using the malware signature scan set to determine whether the content is infected with malware 404 — store content determined to be infected with malware in a quarantine storage 406 — store in association with the content a signature identifier for a malware signature used to identify the content as infected with malware

CLOUD MALWARE FALSE POSITIVE RECOVERY

BACKGROUND

Malware (which is an abbreviation of "malicious software") is a term generally used by computer professionals to refer to a variety of forms of hostile, intrusive, and/or annoying software or program code. Malware may have the form of code, scripts, active content, and/or other form that is designed to disrupt or deny operation, gather information that leads to loss of privacy or exploitation, gain unauthorized access to system resources, and/or perform other abusive behavior. Malware includes various harmful program types, including computer viruses, worms, Trojan horses, spyware, dishonest adware, scareware, crimeware, most rootkits, etc. A computer that has malware present in storage of the computer may be referred to as an infected computer. When malware is loaded and executed by a computer, the malware are enabled to perform its harmful features.

Computer programs have been developed to prevent, detect, and remove malware from infected computers. Such computer programs may be referred to as anti-virus software or "antimalware." A variety of strategies may be used by antimalware to detect malware on a computer. For instance, signature-based detection may be performed. Signature-based detection involves searching for known patterns of data/code of malware within executable code in storage of the computer.

Antimalware products or tools mistakenly classify a small percentage of non-malicious content as malware. A case where non-malicious content is misclassified as malware may be referred to as a false positive (FP) or false determination. Because most antimalware products are configured to automatically block or remove detected malware, such cases of misclassification can result in significant inconvenience or even irreparable harm for users, including reduced or disabled functionality of their computing devices and/or loss or corruption of data. Such issues can be difficult or even impossible to recover from, and are very difficult to even determine their root cause (i.e., that they were caused by antimalware). As such, it is desired to minimize the impact of false positive determinations of malware.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for recovering from false positives of malware detection, and for reducing the occurrence of such false positives. Malware signatures that may be causing false positives during software scanning for malware may be detected (e.g., by user feedback, etc.) and revoked or repaired. Computers that are using the malware signatures to detect malware may be notified of the revoked signatures. Content that was identified as containing malware due to the revoked malware signatures may be re-scanned for malware (without using the revoked malware signatures). As such, if the content is determined during the re-scan to not be infected, the content may be re-enabled for usage on the computer (e.g., may be restored from quarantine storage).

For instance, in a method implementation that may be performed in an antimalware provider, a malware signature scan set and a signature identifier list are transmitted to a plurality of clients. The malware signature scan set includes a plurality of malware signatures used to detect content infected with malware. The signature identifier list includes a signature identifier for each of the malware signatures of the malware signature scan set. Indications are received from a subset of the clients that content was manually restored from quarantine storage. A revocation list is generated that includes one or more signature identifiers for malware signatures previously used to detect malware in the content that was manually restored. The revocation list is transmitted to the plurality of clients. The revocation list indicates revoked malware signatures to the clients so that the revoked malware signatures are not used in subsequent scanning, and so that quarantined content may be rescanned without using the revoked malware signatures to determine whether the quarantined content is infected.

In another method implementation that may be performed in an antimalware client, content determined to be infected with malware is stored in a quarantine storage. A signature identifier for a malware signature used to identify the content as infected with malware is stored in association with the content. A revocation list is received that indicates one or more signature identifiers for revoked malware signatures. If the signature identifier stored in association with the stored content is included in the revocation list, the content is rescanned using the modified malware signature scan set to determine whether the content is infected with malware. Furthermore, the malware signature is removed from a malware signature scan set to generate a modified malware signature scan set. A restore process may be invoked to restore the content to working storage if the rescan determines the content is not infected with malware defined by the modified malware signature scan set. If the rescan indicates the content is infected with malware defined by the modified malware signature scan set, one or more signature identifiers for malware signatures in the modified malware signature scan set used to detect the content as infected with malware are stored in association with the content in the quarantine storage.

Furthermore, an antimalware provider is provided that includes a malware signatures distributor. The malware signatures distributor provides a malware signature scan set and a signature identifier list that are transmitted to a plurality of clients. The malware signature scan set includes a plurality of malware signatures used to detect content infected with malware. The signature identifier list includes signature identifiers for the malware signatures of the malware signature scan set. The malware signatures distributor receives indications from a subset of the clients that content was manually restored that was indicated as infected by a particular malware signature included in the malware signature set. The malware signatures distributor generates a revocation list that includes a signature identifier for the particular malware signature to be revoked. The revocation list is transmitted to the plurality of clients.

Still further, an antimalware client is provided that includes a malware signature manager, a scanning module, and a quarantine module. The malware signature manager is configured to manage a malware signature scan set that includes a plurality of malware signatures and a plurality of signatures identifiers associated with the malware signatures. The scanning module is configured to scan content to determine whether the content is infected with malware defined by the malware signature scan set. The quarantine module is configured to store content determined to be infected with malware in a quarantine storage, and to store in association with the content a signature identifier for one or more malware signatures used to identify the content as infected with malware. The malware signature manager is further configured to receive a revocation list that indicates one or more signature identifiers for revoked malware signatures, and to remove the revoked malware signatures from the malware signature scan set to generate a modified malware signature scan set. The scanning module is configured to rescan any content in the quarantine storage that is stored in association with a signature identifier indicated in the revocation list for a revoked malware signature to determine whether the content is infected with malware. The quarantine module is configured to restore rescanned content to working storage if the scanning module determines during the rescan that the rescanned content is not infected with malware defined by the modified malware signature scan set.

Computer program products are also described herein for detecting malware, for recovering from false positives occurring during malware detection, and for further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments relate to techniques for detecting and blocking and/or removing malware from computers. Malware refers to a variety of forms of hostile, intrusive, or annoying software or program code. Computer programs, referred to as anti-virus software or antimalware, have been developed to prevent, detect, and remove malware from infected computers. A variety of strategies may be used by antimalware to detect malware on a computer. For instance, signature-based detection may be performed. Signature-based detection involves searching for known patterns of data/code of malware within executable code. This searching for known patterns is a function of antimalware scanning, where each signature is the description of one such known pattern.

According to embodiments, malware may be detected in content using signature-based detection, and such content may therefore be moved to quarantine storage. In this manner, the content is disabled from causing further harm. However, in some instances, malware signatures used for signature-based detection may subsequently be suspected/determined to be flawed, which may have led to non-infected content being quarantined before the malware signatures were suspected/determined to be flawed. In embodiments, such flawed malware signatures may be revoked or repaired, and content that was erroneously quarantined may be automatically restored according to a network-based trigger mechanism. For instance, automatic revocation of malware signatures may be performed when a threshold level/number of notifications are received indicating that users have manually restored suspected malware infections using a common set of malware signatures. In embodiments, malware signature revocation notifications may be generated that are correlated with content stored in quarantine storage to enable the content to be restored.

Figure 1:
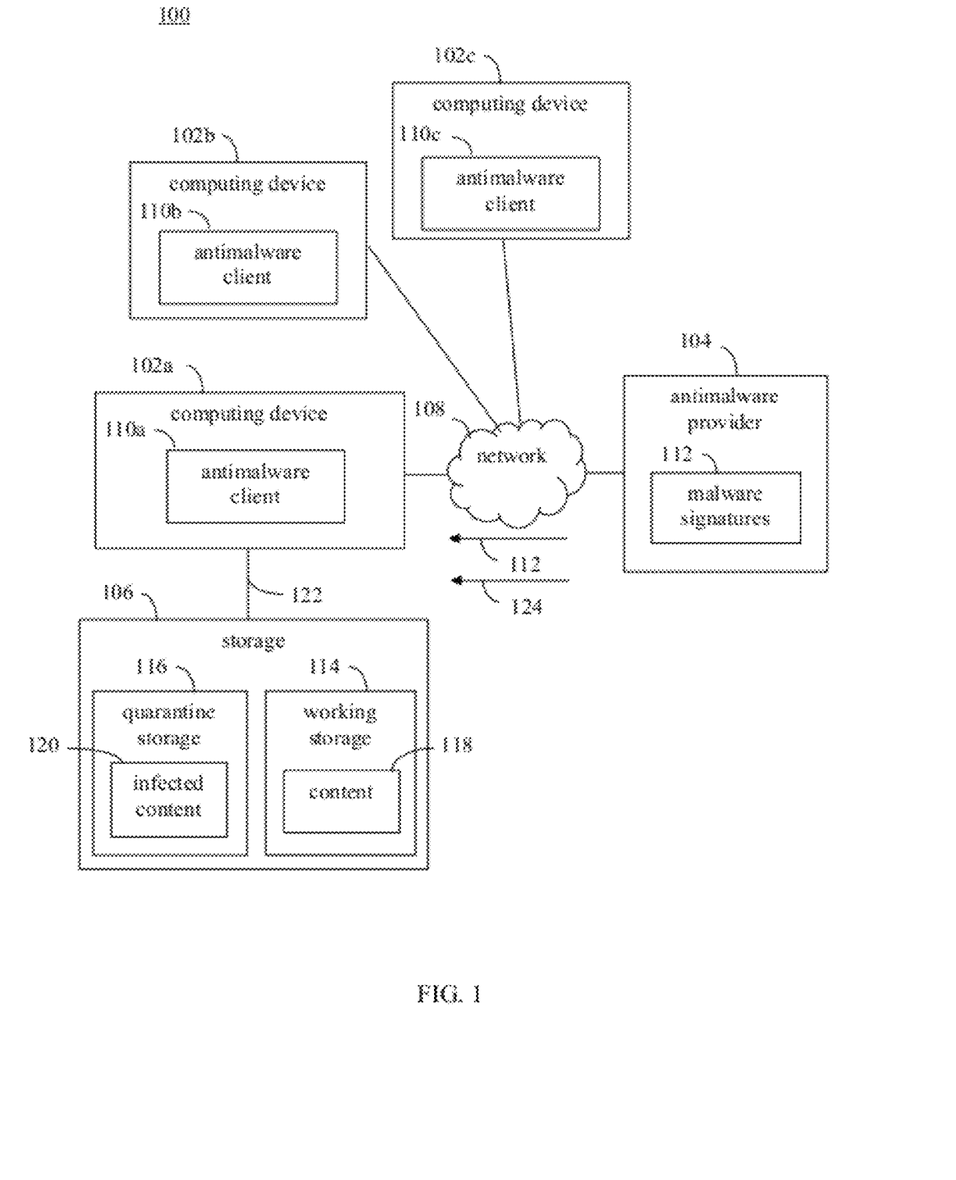
FIG. 1 shows a block diagram of a computing environment, according to an example embodiment.

According to embodiments, malware detection and recovery from false positive detections of malware may be performed in various environments. For instance, FIG. 1 shows a block diagram of a computing environment 100, according to an example embodiment. As shown in FIG. 1, environment 100 includes first-third computing devices 102a-102c, an antimalware provider 104, and storage 106. As shown in FIG. 1, each of computing devices 102a-102c includes a corresponding one of antimalware clients 110a-110c. Environment 100 is described as follows.

Each of computing devices 102a-102c may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, etc.), or other type of mobile device. Antimalware provider 104 may implemented in one or more computer systems, including one or more servers, which may be any type of computing device described herein or otherwise known that is capable of enabling antimalware functionality at computing devices 102a-102c.

Computing devices 102a-102c and antimalware provider 104 are communicatively coupled by network 108. Network 108 may include one or more communication links and/or communication networks, such as a PAN (personal area network), a LAN (local area network), a WAN (wide area network), or a combination of networks, such as the Internet. Computing devices 102a-102c and antimalware provider 104 may be communicatively coupled to network 108 using various links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

Any number of computing devices 102 may be present in environment 100 that are communicatively coupled with antimalware provider 104 by network 108, including tens, hundreds, thousands, and even greater numbers of computing devices 102. Three computing devices 102a-102c are shown in FIG. 1 for purposes of illustration. As shown in FIG. 1, storage 106 is coupled to computing device 102a. Storage 106 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. Although not shown in FIG. 1 for ease of illustration, computing devices 102b and 102c may also have corresponding storage similar to storage 106.

Antimalware provider 104 is configured to provide malware signatures 112 to computing devices 102a-102c. Malware signatures 112 includes a plurality of malware signatures. Each malware signature is a pattern of data and/or program code corresponding to malware that may infect software of computing devices 102a-102c. As mentioned above, each of computing devices 102a-102c includes a corresponding one of antimalware clients 110a-110c. Antimalware clients 110a-110c each receive malware signatures 112, and use malware signatures 112 to perform signature-based malware detection on content of computers 102a-102c, respectively, as would be known to persons skilled in the relevant art(s). When antimalware clients 110a-110c determine that malware is included in content, the infected content may be moved, disabled, or otherwise handled so that the malware is prevented from causing harm.

Note that malware signatures 112 may be provided by antimalware provider 104 to computing devices 102a-102c according to a push or pull model. For instance, antimalware provider 104 may initiate the providing of malware signatures 112 by transmitting malware signatures 112 to computing devices 102a-102c unsolicited in a push fashion (e.g., on a periodic or other basis). Alternatively, computing devices 102a-102c may request malware signatures 112 from antimalware provider 104 in a pull fashion (e.g., on a periodic or other basis).

As shown in FIG. 1, storage 106 includes working storage 114 and quarantine storage 116. Working storage 114 and quarantine storage 116 may be separate storage devices of storage 106, may be respective regions of a same storage device 106, or may be distributed over multiple storage devices of storage 106 in any other way. Working storage 114 is used to store content 118 for normal access by computer 102a and users of computer 102a. Content 118 may include any type of content, including files (e.g., data files, audio files, video files, configuration files, web page files, etc.), applications, and/or other content objects. Quarantine storage 116 is used to store content of working storage 114 that is determined to be infected with malware by antimalware client 110a during a malware scanning process. The content stored in quarantine storage 116 is moved from working storage 114 and stored as infected content 120. Infected content 120 is not intended to be accessed by computer 102a and users of computer 102a.

In some cases, non-malicious content may be misclassified as malware due to a false positive (FP) or false determination. Because most antimalware products are configured to automatically block or remove detected malware, such cases of misclassification can result in significant inconvenience for users, including reduced or disabled functionality of their computing devices and/or loss or corruption of data. Such issues can be difficult or even impossible to recover from, and are very difficult to even determine their root cause (i.e., that they were caused by antimalware).

In embodiments, antimalware provider 104 may revoke or repair some malware signatures determined or suspected as being defective, causing false positive malware determinations to occur. In such case, antimalware provider 104 may transmit a revocation list 124 to computing devices 102a-102c. Revocation list 124 identifies one or more malware signatures that have been revoked. In some embodiments, revocation list 124 may identify one or more malware signatures that may be causing false positive malware determinations for repair, and antimalware provider 104 may provide replacement malware signatures for the malware signatures to be repaired. Computing devices 102a-102c each receive revocation list 124. As a result, computing devices 102a-102c may determine content of infected content 120 that was previously determined to be infected by one or more of the revoked malware signatures of revocation list 124, and antimalware clients 110a-110c may rescan the determined content using malware signatures 112 other than those indicated by revocation list 124. With regard to computing device 102a and storage 106, if the content is determined by antimalware client 110a to be infected during the rescan, the content may remain in quarantine storage 116 as infected content 120. If the content is determined by antimalware client 110a to not be infected during the rescan, the content may be moved back to working storage 114 as content 118.

Antimalware clients 110 and antimalware provider 104 may perform their functions in various ways, in embodiments. Numerous exemplary embodiments of Antimalware clients 110 and antimalware provider 104, and further embodiments for performing antimalware protection are described as follows. It noted that any section/subsection headings provided herein are not intended to be limiting. Embodiments are described throughout this document, and any type of embodiment may be included under any section/subsection.

A. Example Embodiments for Enabling Antimalware Detection

In embodiments, antimalware provider 104 may be configured to enable antimalware detection by antimalware clients 110 by providing antimalware signatures 112 to antimalware clients 110. For instance, antimalware provider 104 may perform a step 202 shown in FIG. 2 to enable antimalware detection by clients, according to an example embodiment. In step 202, a malware signature scan set and a signature identifier list are transmitted to a plurality of clients. For instance, in an embodiment, antimalware provider 104 may transmit a malware signature scan set and a signature identifier list in malware signatures 112, shown in FIG. 1. The malware signature scan set includes a set of one or more malware signatures, and the signature identifier list includes a list of identifiers (e.g., numeric or alphanumeric codes) corresponding to the malware signatures of the malware signature scan set. Note that in an alternative embodiment, the signature identifier list is not transmitted by antimalware provider 104 to antimalware clients 110. In such an embodiment, antimalware clients 110 may be configured to generate the identifiers of the signature identifier list based on the corresponding malware signatures stored at antimalware clients 110 (e.g., by performing hashes of the malware signatures using a hash generator, etc.).

Figure 2:
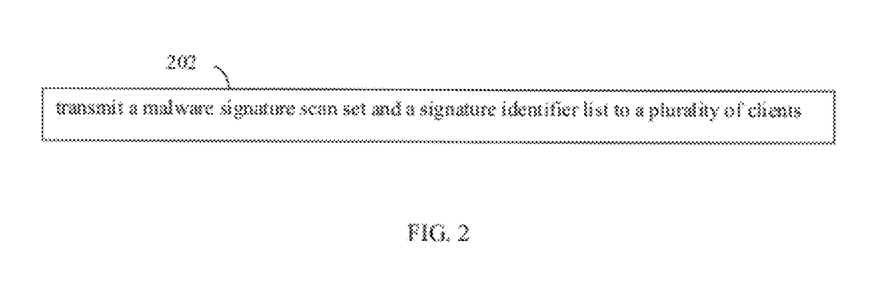
FIG. 2 shows a process for providing information to clients to be used for malware detection, according to an example embodiment.
Figure 3:
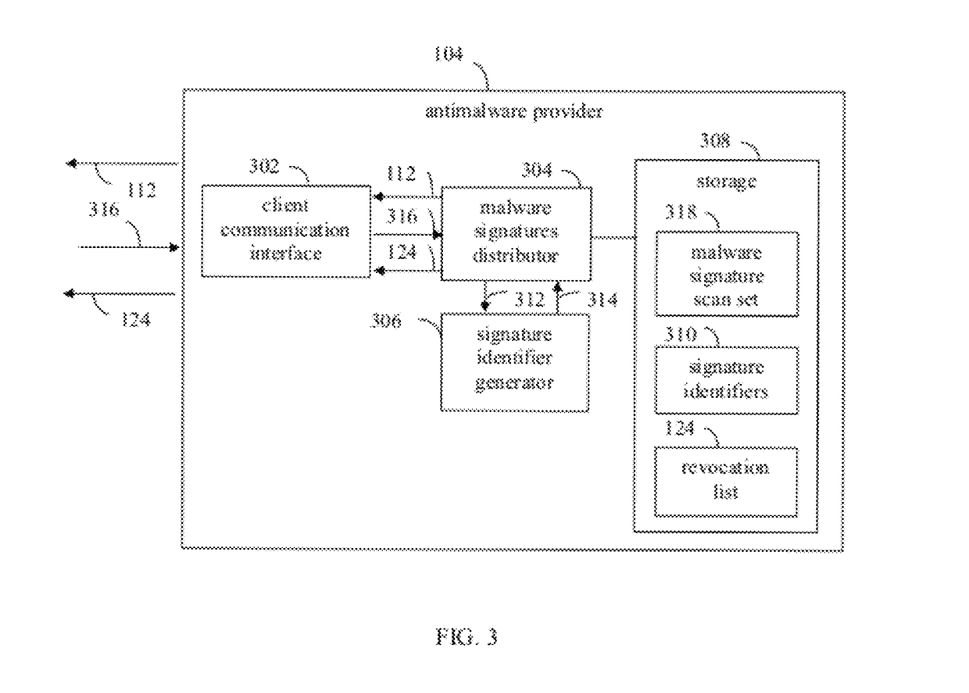
FIG. 3 shows a block diagram of an antimalware provider, according to an example embodiment.

Antimalware provider 104 may be configured in various ways to perform its functions including step 202 of FIG. 2. For instance, FIG. 3 shows a block diagram of antimalware provider 104, according to an example embodiment. As shown in FIG. 3, antimalware provider 104 includes a client communication interface 302, a malware signatures distributor 304, a signature identifier generator 306, and storage 308. Antimalware provider 104 of FIG. 3 is described as follows.

As shown in FIG. 3, storage 308 stores a malware signature scan set 318 and signature identifiers 310. Malware signatures distributor 304 is configured to manage malware signature scan set 318 and signature identifiers 310. When new malware is discovered and analyzed, a corresponding malware signature that may be used to detect the new malware may be added to malware signature scan set 318 by malware signatures distributor 304. Furthermore, a new signature identifier for the malware signature may be added to signature identifiers 310. For instance, malware signatures distributor 304 may generate a signature identifier request 312 that is received by signature identifier generator 306. Signature identifier generator 306 is configured to generate signature identifiers for malware signatures. A signature identifier is used to uniquely identify a corresponding malware signature. In response to signature identifier request 312, signature identifier generator 306 may generate a signature identifier for the new malware signature identified by request 312. Signature identifier generator 306 may generate signature identifiers for malware signatures in any manner, including using proprietary techniques and/or techniques known to persons skilled in the relevant art(s). For instance, in an embodiment, signature identifier generator 306 may perform a hash of the malware signature (e.g., a hash of the computer code of the malware signature) to generate a hash value, so that signature identifiers in the signature identifier list are hashes of the malware signatures of malware signature scan set 318. The hash value may be a numerical value (e.g., in decimal form, in hexadecimal form, etc.) that is used as the signature identifier for the malware signature. In other embodiments, other techniques may be used to generate the signature identifier.

As shown in FIG. 3, signature identifier generator 306 generates signature identifier 314, which includes the signature identifier generated for the malware signature of request 312. Malware signatures distributor 304 receives signature identifier 314, and stores signature identifier 314 in signature identifiers 310 (in storage 308) in association with the corresponding malware signature of malware signature scan set 318.

Malware signatures distributor 304 is configured to distribute malware signature scan set 318 and signature identifiers 310 to antimalware clients to be used to detect malware in computing devices. For instance, as shown in FIG. 3, malware signatures distributor 304 may access malware signature scan set 318 and signature identifiers 310 in storage 308, and provide malware signature scan set 318 and signature identifiers 310 to client communication interface 302 as malware signatures 112. Client communication interface 302 is configured to enable communications with clients (e.g., over a network, such as network 108 in FIG. 1) for antimalware provider 104. For instance, as shown in FIG. 3, client communication interface 302 may transmit malware signatures 112 in a communication signal from antimalware provider 104 to be received by clients (e.g., clients 110a-110c shown in FIG. 1). Client communication interface 302 may be configured in any manner to communicate over any type of network, wired or wireless, as desired for a particular application. Examples of client communication interface 302 include such an IEEE 802.11 wireless LAN (WLAN) wireless interface, a Worldwide Interoperability for Microwave Access (Wi-MAX) interface, an Ethernet interface, a Universal Serial Bus (USB) interface, etc. Further examples of interface 302 are described further below with respect to FIG. 9.

B. Example Embodiments for Performing Antimalware Detection

Figure 4:
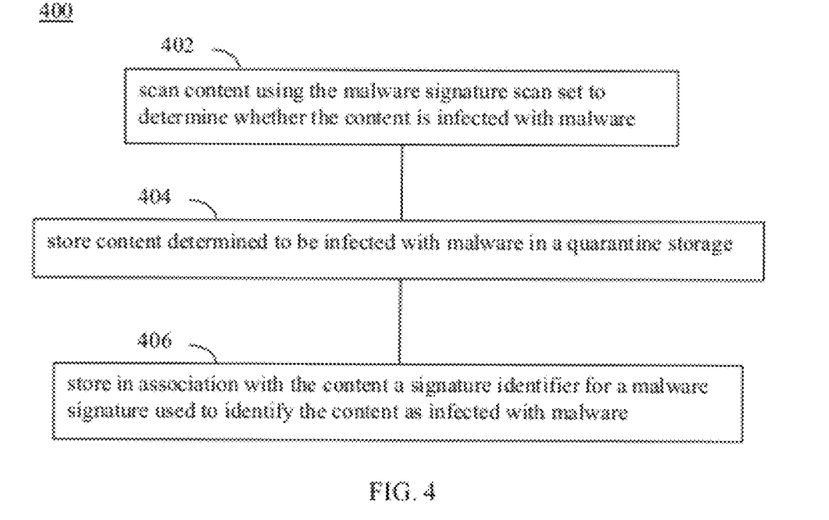
FIG. 4 shows a flowchart providing a process for performing antimalware detection, according to an example embodiment.
Figure 5:
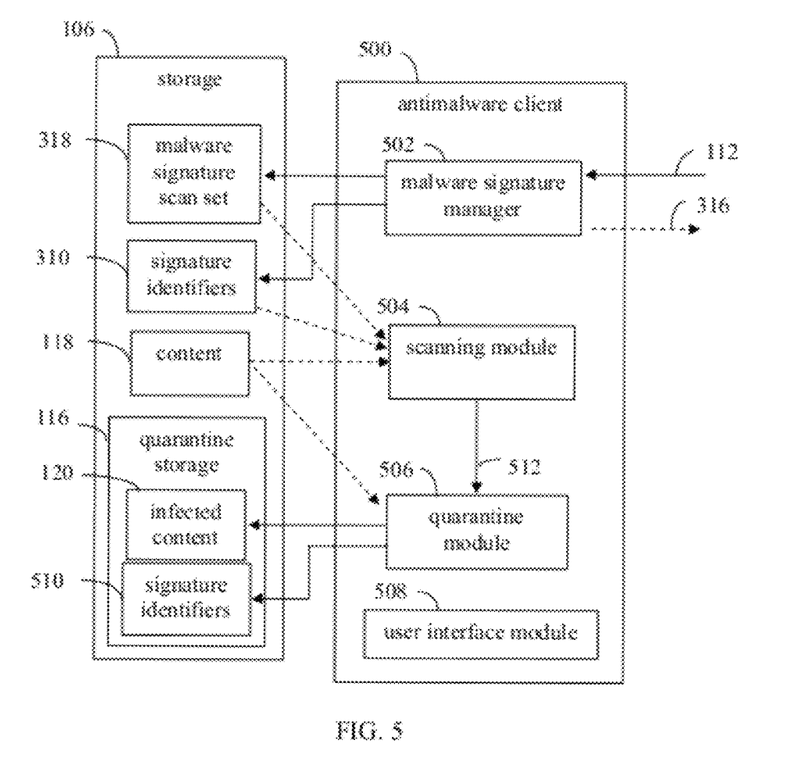
FIG. 5 shows a block diagram of an antimalware client, according an example embodiment.

In embodiments, antimalware clients 110a-110c of FIG. 1 may be configured to perform antimalware detection based on antimalware signatures 112 received from antimalware provider 104. For instance, antimalware clients 110a-110c may each operate according to a process shown in FIG. 4. FIG. 4 shows a flowchart 400 providing a process for performing antimalware detection, according to an example embodiment. Flowchart 400 is described as follows with reference to FIG. 5. FIG. 5 shows a block diagram of an antimalware client 500 and storage 106, according an example embodiment. Antimalware client 500 of FIG. 5 is an example of antimalware client 110a of FIG. 1. As shown in FIG. 5, antimalware client 500 includes a malware signature manager 502, a scanning module 504, a quarantine module 506, and a user interface module 508. Further structural and operational embodiments will be apparent to persons skilled in the relevant art(s) based on the following discussion regarding flowchart 400 and antimalware client 500.

Flowchart 400 begins with step 402. In step 402, content is scanned using the malware signature scan set to determine whether the content is infected with malware. For instance, as shown in FIG. 5, malware signatures 112 may be received by a communications interface (not shown in FIG. 5) of the computing device that contains antimalware client 500, which may provide malware signatures 112 to malware signature manager 502. Malware signature manager 502 manages malware signatures for antimalware client 500. For instance, as indicated in FIG. 5, malware signature manager 502 may store malware signature scan set 318 and signature identifiers 310 received in malware signatures 112 from malware provider 104 in storage 106. Scanning module 504 is configured to scan content 118 in storage 106 using malware signatures of malware signature scan set 318 to detect malware. Scanning module 504 may scan content 118 using malware signatures according to proprietary techniques and/or techniques known to persons skilled in the relevant art(s). For example, scanning module 504 may separately scan/search each file and/or other object of content 118 for the data/code of each malware signature. If the data/code of a malware signature is found in a file or other object of content 118, the file or other object is deemed to be infected by malware that the malware signature is configured to detect. In some cases, multiple malware signatures of a predetermined set of malware signatures need to be found in a file or other object for the file or other object to be deemed to be infected by particular malware. If a file or other object is determined to be infected with malware by scanning module 504, scanning module 504 generates infected content indication 512, which indicates the file or other object of content 118 determined to be infected, and indicates the signature identifier(s) 310 associated with the malware signature of malware signature scan set 318 used by scanning module 504 to detect the malware.

In step 404, content determined to be infected with malware is stored in quarantine storage. As shown in FIG. 5, quarantine module 506 receives infected content indication 512. Quarantine module 506 is configured to store files and/or other objects of content 118 identified in infected content indication 512 in quarantine storage 116 as infected content 120. In an embodiment, quarantine module 506 accesses the content in storage 106 (e.g., in working storage 114 of FIG. 1), and stores the content in quarantine storage 116 as infected content 120, and deletes the content from content 118.

In step 406, a signature identifier for a malware signature used to identify the content as infected with malware is stored in association with the content. As shown in FIG. 5, quarantine module 506 is further configured to store the signature identifier identified in infected content indication 512 in quarantine storage 116 in association with the infected content stored in quarantine storage 116 as infected content 118. The identified signature identifier is stored in signature identifiers 510 in quarantine storage 116.

Note that quarantine module 506 may store signature identifiers 510 in quarantine storage 116 in any manner, including storing each signature identifier separately in quarantine storage 116 in association with the corresponding infected content, or may store signatures identifiers 510 for all of the infected content in a common data structure (e.g., a table, list, array, etc.) that includes pointers to the corresponding infected content. Furthermore, note that in an embodiment, a signature identifier may be stored in association with a malware incident as a whole, which may include multiple files, registry keys, and/or other objects included in the content.

C. Example Embodiments for Revoking Malware Signatures

Figure 6:
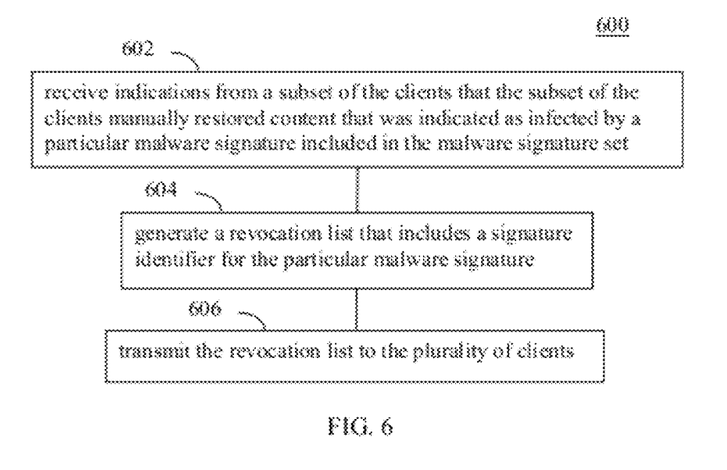
FIG. 6 shows a flowchart providing a process for revoking malware signatures, according to an example embodiment.

In embodiments, antimalware provider 104 may be configured to revoke and/or repair malware signatures previously disseminated to antimalware clients 110 in various ways. For instance, antimalware provider 104 may perform a process shown in FIG. 6. FIG. 6 shows a flowchart 600 providing a process for revoking malware signatures, according to an example embodiment. Flowchart 600 is described as follows with reference to antimalware provider 104 of FIG. 3 for purposes of illustration. Further structural and operational embodiments will be apparent to persons skilled in the relevant art(s) based on the following discussion regarding flowchart 600 and antimalware provider 104.

Flowchart 600 begins with step 602. In step 602, indications are received from a subset of the clients that the subset of the clients manually restored content that was indicated as infected by a particular malware signature included in the malware signature set. For example, as shown in FIG. 3, antimalware provider 104 may receive a restore indication 316 from one or more clients (e.g., from one or more of antimalware clients 110a-110c of computing devices 102a-102c in FIG. 1). Restore indication 316 indicates that content that was previously determined to be infected with malware (e.g., stored as infected content 120) was restored at a computing device.

For instance, referring to FIG. 5, a user of a computing device that includes antimalware client 500 may interact with a user interface generated by user interface module 508 to manually select and restore content of infected content 120 to content 118. The user may have decided to restore the infected content for any reason. For instance, the user may have noticed that problems exhibited by the computing device persisted even after the content determined to be infected was quarantined. Alternatively, the user may believe that the quarantined content is not actually infected with malware for any other reason, and may accordingly decide to restore the content. Upon restoring the infected content, malware signature manager 502 may determine the signature identifier(s) 510 stored in quarantine storage 116 that is associated with restored content, which identifies the malware signature that was used to determine the restored content as infected. Malware signature manager 502 may transmit the determined signature identifier to antimalware provider 104 in restore indication 316. For instance, a communications interface of the computing device that contains antimalware client 500 may transmit restore indication 316 in a communication signal.

As shown in FIG. 3, client communication interface 302 receives restore indication 316 at antimalware provider 104 in a communication signal. Client communication interface 302 provides restore indication 316 to malware signatures distributor 304. As described above, restore indication 316 may provide a signature identifier for a malware signature used to determine restored content as infected. If a particular signature identifier is frequently received in restore indications 316, it may be the case that the corresponding malware signature is unreliable or defective in that it is identifying content as infected with malware when the content is not actually infected. As such, it may be desirable to revoke the malware signature so that it is not used in future malware scans at clients. Note that in an alternative embodiment, the functions of providing malware signatures and of deploying and running antimalware (and processing received restore indications 316), as described above for antimalware provider 104, may be performed by separate entities. For instance, in one example embodiment, antimalware provider 104 may handle providing malware signatures as described herein, while a second provider may manage revocation of malware signatures locally (under the assumption that similar antimalware systems will be used by the users of that network).

For instance, if a signature identifier is received a threshold number of times in restore indications 316 from clients, as determined by malware signatures distributor 304, the corresponding malware signature may be revoked and/or may be repaired. For example, the threshold may be a minimum threshold number of clients reporting restore indications 316, a minimum threshold percentage of the client population reporting restore indications, or other type of threshold. The value of the minimum threshold may be selected based on one or more properties of the malware signature. For instance, the threshold may be determined based on an amount of time the particular malware signature has been in circulation. A relatively recently published malware signature (e.g., published a few days ago) may have a lower threshold value relative to a malware signature that has been in usage for a relatively long period of time (e.g., published months ago). In another example, an automatically-generated malware signature may have a lower threshold than an analyst-generated malware signature.

Referring back to FIG. 6, in step 604, a revocation list is generated that includes a signature identifier for the particular malware signature. For example, referring to FIG. 3, in response to receiving a threshold number of restore indications 316 that include a particular signature identifier from clients, malware signatures distributor 304 may add the signature identifier to a revocation list. The revocation list may list one or more signature identifiers added to the revocation list over a period of time that correspond to malware signatures that are to be revoked. For instance, malware signatures distributor 304 may store and/or maintain the revocation list in storage 308 as revocation list 124. Note that in an embodiment, revocation list 124 may indicate one or more malware signatures for repair (e.g., for replacement with a similar malware signature that has one or more defects of the malware signature to be replaced removed).

In step 606, the revocation list is transmitted to the plurality of clients. For example, as shown in FIG. 3, malware signature distributor 304 may access revocation list 124 in storage 308, and may provide revocation list 124 to client communication interface 302. Client communication interface 302 may transmit revocation list 124 in a communication signal from antimalware provider 104 to be received by clients (e.g., clients 110a-110c shown in FIG. 1). Note that malware signature distributor 304 may transmit revocation list 124 at any time, including on a periodic basis (e.g., each day, each week, each month, etc.), whenever a signature identifier is added to revocation list 124, when a threshold number of signature identifiers is added to revocation list 124, upon a request from one or more computing devices, and/or at any other time or event occurrence.

As described below, clients may rescan and restore content from quarantine storage that were quarantined based on revoked and/or repaired malware signatures identified in revocation list 124.

D. Example Embodiments for Restoring Erroneously Quarantined Content after Malware Signatures are Revoked In embodiments, antimalware clients 110a-110c of FIG. 1 may be configured to rescan and restore content from quarantine storage that were quarantined based on revoked and/or repaired malware signatures identified in revocation list 124. For instance, antimalware clients 110a-110c may contact a network service, such as antimalware provider 104 to receive new malware signatures or to revoke existing malware signatures. Alternatively, a network administrator that manages an anti-malware deployment (e.g., manages antimalware clients 102a-120c) may provide the new malware signatures and/or may revoke existing malware signatures. In one embodiment, when a service receives customer complaints or significant telemetry indicating a potential false positive for a malware signature, an analyst may instruct servers to notify all clients to immediately stop using the affected signatures until an updated signature set can be delivered.

Figure 7:
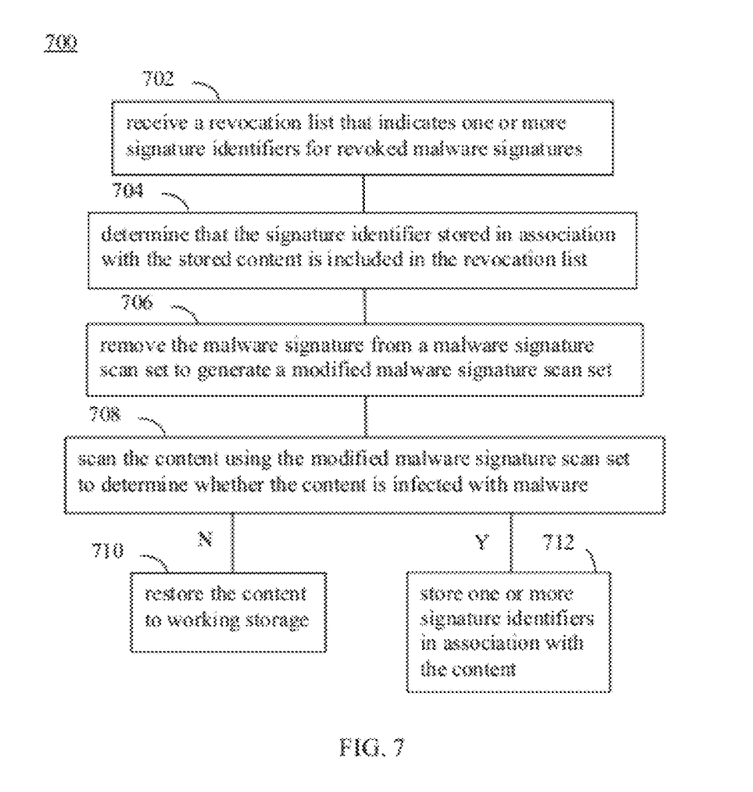
FIG. 7 shows a flowchart providing a process for restoring content that was quarantined due to a false positive malware detection, according to an example embodiment.

For instance, in an embodiment, antimalware clients 110a-110c may each operate according to a process shown in FIG. 7. FIG. 7 shows a flowchart 700 providing a process for performing antimalware detection, according to an example embodiment. Flowchart 700 is described as follows with reference to FIG. 8, which shows antimalware client 500 of FIG. 5, according an example embodiment. Further structural and operational embodiments will be apparent to persons skilled in the relevant art(s) based on the following discussion regarding flowchart 700 and antimalware client 500 of FIG. 8.

Figure 8:
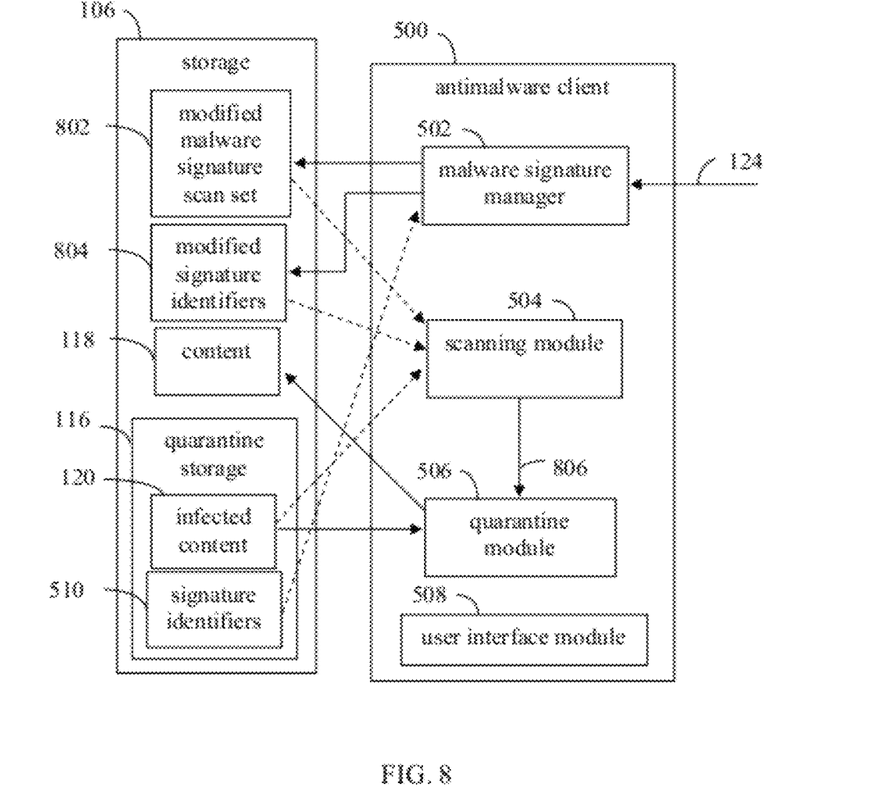
FIG. 8 shows a block diagram of the antimalware client of FIG. 5 rescanning quarantined content as a result of revoked malware signatures, according an example embodiment.

Flowchart 700 begins with step 702. In step 702, a revocation list is received that indicates one or more signature identifiers for revoked malware signatures. For example, FIG. 8 shows revocation list 124 being received by malware signature manager 502 of antimalware client 500. For instance, revocation list 124 may be received by a communications interface (not shown in FIG. 8) of the computing device that contains antimalware client 500, which may provide revocation list 124 to malware signature manager 502. As described above, revocation list 124 indicates one or more signature identifiers for malware signatures revoked by antimalware provider 104, and may optionally list one or more signature identifiers for malware signatures to be repaired.

Revocation list 124 may have any form, including the form of a data structure such as a table, an array, etc. An example of revocation list 124 is shown as follows for purposes of illustration:

34567

32187

...

As shown in the above example of revocation list 124, two signature identifiers are listed (and further signature identifiers may be present that are not shown). The signature identifiers are shown as being five digit numbers, but may have alternative forms in other embodiments. In this example, each of the two signature identifiers is used to identify a particular corresponding malware signature that has been revoked (or is to be repaired) by antimalware provider 104.

In step 704, the signature identifier stored in association with the stored content is determined to be included in the revocation list. In an embodiment, malware signature manager 502 is configured to compare revocation list 124 to signature identifiers 510 in quarantine storage 116 to determine whether any content of infected content 120 was previously determined by scanning module 504 to be infected by a revoked malware signature. Any content of infected content 120 that was determined to be infected by a revoked malware signature may actually not be infected by malware, and as described below, may be rescanned for malware using malware signatures that do not include the revoked malware signatures.

For instance, in one example provided for purposes of illustration, the following signature identifiers may be included in signature identifiers 510 in quarantine storage 116 with associated content:

34567 movieplayer.exe
12345 virus.exe, runkey

As shown in the above example, the signature identifier 34567 may be included in signature identifiers 510 in association with the file "movieplayer.exe" stored in quarantine storage 116. As such, the malware signature identified by signature identifier 34567 was used to detect malware in moveiplayer.exe. Furthermore, the signature identifier 12345 may be included in signature identifiers 510 in association with the files "virus.exe" and "runkey" stored in quarantine storage 116. As such, the malware signature identified by signature identifier 12345 was used to detect malware in each of virus.exe and runkey.

Continuing this example, malware signature manager 502 may compare the example of revocation list 124 above (containing signature identifiers 34567 and 32187) to signature identifiers 510 (containing signature identifiers 34567 and 12345). For instance, in an embodiment, malware signature manager 502 may include a compare module configured to perform the comparison. By the comparison, malware signature manager 502 may determine that the malware signature identified by signature identifier 34567 used to detect malware in the file movieplayer.exe is present in revocation list 124, and therefore a revoked malware signature was used to detect malware in movieplayer.exe. Any number of revoked malware signatures that were previously used to detect malware in quarantined files and/or other objects may be determined in this manner.

Referring back to FIG. 7, in step 706, the malware signature is removed from a malware signature scan set to generate a modified malware signature scan set. For example, in an embodiment, malware signature manager 502 may remove any malware signatures identified by signature identifiers in revocation list 124 from malware signature scan set 318 (FIG. 5) to generate a modified malware signature scan set 802 in FIG. 8. In this manner, revoked malware signatures will not be used in subsequent scanning. Furthermore, any signature identifiers included in revocation list 124 may be removed from signature identifiers 310 (FIG. 5) to generate modified signature identifiers 804 in FIG. 8. Note that in an embodiment, malware signature manager 502 may repair one or more malware signatures based on revocation list 124. If a malware signature is repaired (e.g., replaced with a non-defective malware signature), malware signature manager 502 may not remove the identifier for the repaired malware signature from modified signature identifiers 804. As such, the repaired malware signature may be used in subsequent antimalware scans.

In step 708, the content is scanned using the modified malware signature scan set to determine whether the content is infected with malware. For instance, as shown in FIG. 8, scanning module 504 receives modified malware signature scan set 802 and modified signature identifiers 804. Scanning module 504 may scan infected content 120 in quarantine storage 116 using malware signatures of modified malware signature scan set 802 to detect malware. Scanning module 504 may scan infected content 120 in a similar manner as described above (e.g., step 402 of FIG. 4). If content of infected content 120 is not determined to be infected with malware, operation proceeds to step 710. If content of infected content 120 is determined to be infected with malware, operation proceeds to step 712.

In step 710, the content is restored to working storage. For instance, if the content of infected content 120 that was previously determined to be infected with malware is determined in step 708 to not be infected (now that the revoked malware signatures(s) is/are not longer being used during the scan), the content may be restored from quarantine storage 116 to working storage. The content may be restored to its original location (the location in working storage from which the content was moved to quarantine storage 116) or to other location in storage 106. As such, in an embodiment, scanning module 504 may generate rescan results 806 that indicate that the content is to be restored. Quarantine module 506 receives rescan results 806, and accordingly moves the indicated content from infected content 120 in quarantine storage 116 to content 118.

In step 712, one or more signature identifiers is/are stored in association with the content. For instance, if the content of infected content 120 that was previously determined to be infected with malware is determined in step 708 to be infected (even though the revoked malware signatures(s) is/are not longer being used during the scan), the content may remain in quarantine storage 116. As such, in an embodiment, scanning module 504 may generate rescan results 806 that indicate that the content is to remain in infected content 120, and may provide one or more signature identifiers for the malware signature(s) used to detect malware in the content during the rescan. Quarantine module 506 receives rescan results 806, and accordingly includes the provided signature identifiers in signature identifiers 510 in association with the content (while the revoked malware signatures are removed from signature identifiers 510).

For instance, continuing the example provided above, in step 708, scanning module 504 may rescan movieplayer.exe, which had been previously determined to be infected by a revoked malware signature corresponding to the signature identifier 34567. If during the rescan (which does not include the revoked malware signature) movieplayer.exe is not determined to be infected with malware, movieplayer.exe may be restored to working storage (in step 710). If movieplayer.exe is determined during the rescan to be infected with malware, movieplayer.exe may remain in infected content 120, and the signature identifier(s) of the malware signature(s) used to detect malware in movieplayer.exe during the rescan may be included in signature identifiers 510 (in step 712).

Note that it is possible that the restore of step 710 may fail for various reasons (e.g., a storage device problem, etc.). In such case, user interface module 508 may optionally provide a notification regarding the revoked malware signature to a user of the computing device that includes antimalware client 500. Furthermore, user interface module 508 may be configured to request instructions from the user regarding the failed restore of the content. For instance, the user interface module 508 may generate a user interface that enables the user to re-try the failed restore, to cancel the restore (and enable the user to restore the content from other source), and/or to perform otherwise. If the restore succeeds in step 710, user interface module 508 may optionally provide a notification regarding the revoked malware signature to a user (e.g., to let the user know that the content was restored, etc.).

III Example Computing Device Embodiments

Antimalware clients 110a-110c, antimalware provider 104, malware signatures distributor 304, signature identifier generator 306, antimalware client 500, malware signature manager 502, scanning module 504, quarantine module 506, user interface module 508, step 202, and flowcharts 400, 600, and 700 may be implemented in hardware, software, firmware, or any combination thereof. For example, antimalware clients 110a-110c, antimalware provider 104, malware signatures distributor 304, signature identifier generator 306, antimalware client 500, malware signature manager 502, scanning module 504, quarantine module 506, user interface module 508, step 202, flowchart 400, flowchart 600, and/or flowchart 700 may be implemented as computer program code configured to be executed in one or more processors. Alternatively, antimalware clients 110a-110c, antimalware provider 104, malware signatures distributor 304, signature identifier generator 306, antimalware client 500, malware signature manager 502, scanning module 504, quarantine module 506, user interface module 508, step 202, flowchart 400, flowchart 600, and/or flowchart 700 may be implemented as hardware logic/electrical circuitry. For instance, in an embodiment, one or more of antimalware clients 110a-110c, antimalware provider 104, malware signatures distributor 304, signature identifier generator 306, antimalware client 500, malware signature manager 502, scanning module 504, quarantine module 506, user interface module 508, step 202, flowchart 400, flowchart 600, and/or flowchart 700 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

User interface module 508 (FIG. 5) may enable user input to be provided from one or more of any type of user interface elements provided by a computing device 102, including a keyboard, a thumb wheel, a pointing device, a roller ball, a stick pointer, a touch sensitive display, any number of virtual interface elements, a voice recognition system, etc.

Figure 9:
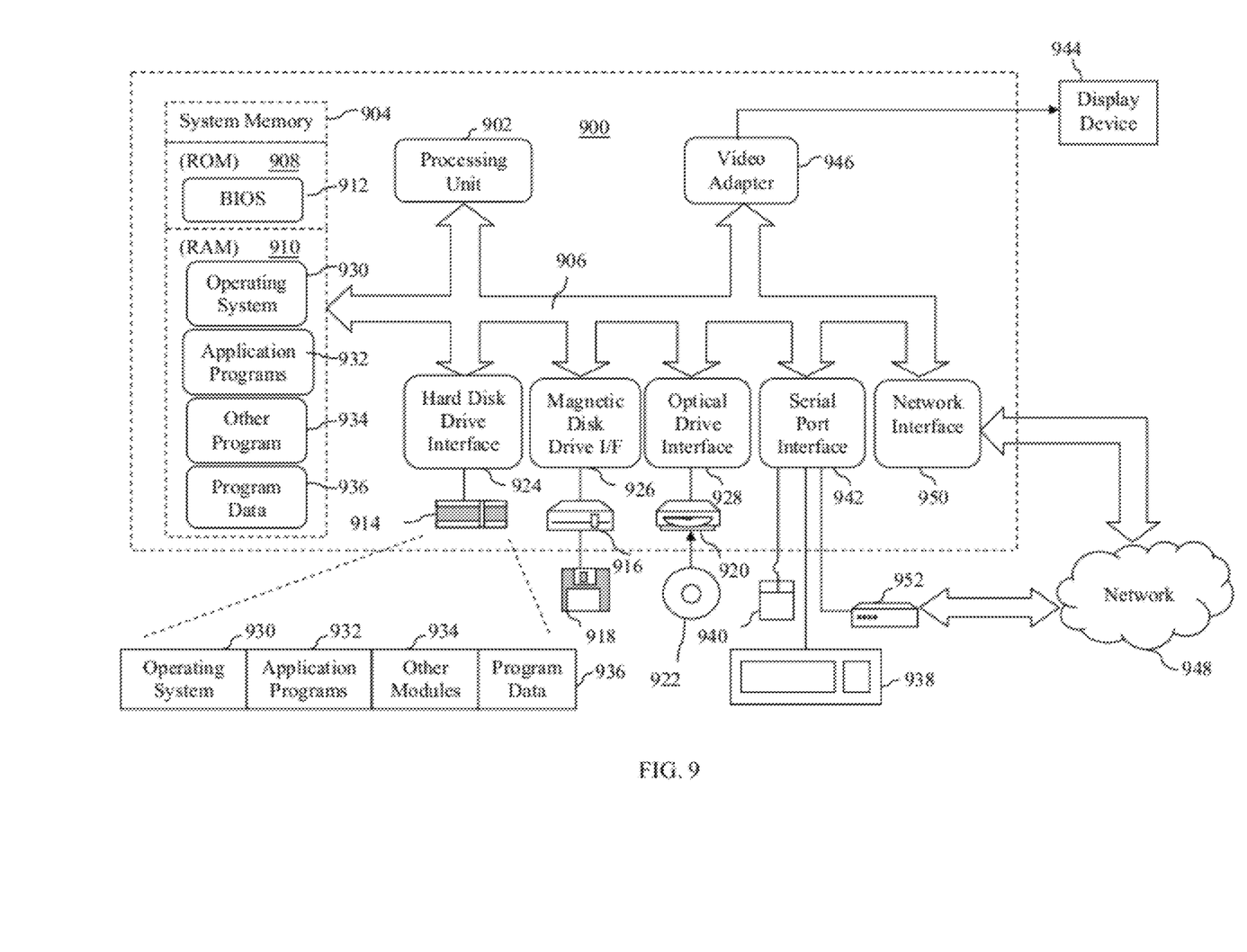
FIG. 9 shows a block diagram of an example computer that may be used to implement embodiments of the present invention.

FIG. 9 depicts an exemplary implementation of a computer 900 in which embodiments of the present invention may be implemented. For example, computing device 102a may be implemented in a computer system similar to computer 900, including one or more features of computer 900 and/or alternative features. Furthermore, antimalware provider 104 may be implemented in one or more computer systems similar to computer 900. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments of the present invention may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing antimalware clients 110a-110c, antimalware provider 104, malware signatures distributor 304, signature identifier generator 306, antimalware client 500, malware signature manager 502, scanning module 504, quarantine module 506, user interface module 508, step 202, flowchart 400, flowchart 600, and/or flowchart 700 (including any step of flowcharts 400, 600, and 700), and/or further embodiments described herein.

A user may enter commands and information into the computer 900 through input devices such as keyboard 938 and pointing device 940. Other input devices (not shown) may include a microphone, joystick, game pad, satellite dish, scanner, or the like. These and other input devices are often connected to the processing unit 902 through a serial port interface 942 that is coupled to bus 906, but may be connected by other interfaces, such as a parallel port, game port, or a universal serial bus (USB).

A display device 944 is also connected to bus 906 via an interface, such as a video adapter 946. In addition to the monitor, computer 900 may include other peripheral output devices (not shown) such as speakers and printers.

Computer 900 is connected to a network 948 (e.g., the Internet) through an adaptor or network interface 950, a modem 952, or other means for establishing communications over the network. Modem 952, which may be internal or external, is connected to bus 906 via serial port interface 942.

As used herein, the terms "computer program medium," "computer-readable medium," and "computer-readable storage medium" are used to generally refer to media such as the hard disk associated with hard disk drive 914, removable magnetic disk 918, removable optical disk 922, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments of the present invention discussed herein. Accordingly, such computer programs represent controllers of the computer 900.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in an antimalware provider, comprising:
transmitting a malware signature scan set and a signature identifier list to a plurality of clients, the malware signature scan set including a plurality of malware signatures used to detect content infected with malware, the signature identifier list including signature identifiers for the malware signatures of the malware signature scan set, and malware being a malicious executable software program that performs a function harmful to a computer in response to executing;
receiving indications from a subset of the clients that each client of the subset of the clients manually restored content that was indicated as infected by a particular malware signature included in the malware signature set from respective quarantine storages to respective working storages, the respective quarantine storages configured to prevent execution of the content that was indicated as infected in the quarantine storage;
determining that the number of clients in the subset is greater than a predetermined threshold number of clients, the predetermined threshold number of clients being based at least on an amount of time that the particular malware signature has been in circulation;
generating a revocation list that includes a signature identifier for the particular malware signature; and
transmitting the revocation list to the plurality of clients to enable quarantined content to be restored to working storage.

2. The method of claim 1, wherein generating comprises:
generating the revocation list as a result of said determining.

3. The method of claim 2, wherein the predetermined threshold number of clients is a predetermined percentage of a total number of the clients.

4. The method of claim 2, further comprising:
determining the predetermined threshold based on at least one property of the malware signature.

5. The method of claim 4, wherein said determining the predetermined threshold based on at least one property of the particular malware signature comprises:
determining the amount of time the particular malware signature has been in circulation, and setting the predetermined threshold to be based on the amount of time.

6. The method of claim 4, wherein said determining the predetermined threshold based on at least one property of the particular malware signature comprises:
determining a generator of the particular malware signature as being an analyst or an auto-generator, and setting the predetermined threshold based on the determined generator.

7. The method of claim 1, further comprising:
generating the signature identifiers in the signature identifier list as hashes of the malware signatures of the malware signature scan set.

8. An antimalware provider system, comprising:
at least one memory configured to store program instructions; and
at least one processor configured to access the at least one memory and to execute the program instructions, the program instructions comprising:
first instructions configured to transmit a malware signature scan set and a signature identifier list to a plurality of clients, the malware signature scan set including a plurality of malware signatures used to detect content infected with malware, the signature identifier list including signature identifiers for the malware signatures of the malware signature scan set, and malware being a malicious executable software program that performs a function harmful to a computer in response to executing;
second instructions configured to receive indications from a subset of the clients that each client of the subset of the clients manually restored content that was indicated as infected by a particular malware signature included in the malware signature set from respective quarantine storages to respective working storages, the respective quarantine storages configured to prevent execution of the content that was indicated as infected in the quarantine storage;
third instructions configured to determine that the number of clients in the subset is greater than a predetermined threshold number of clients, the predetermined threshold number of clients being based at least on an amount of time that the particular malware signature has been in circulation;

fourth instructions configured to generate a revocation list that includes a signature identifier for the particular malware signature; and fifth instructions configured to transmit the revocation list to the plurality of clients to enable quarantined content to be restored to working storage.

9. The antimalware provider system of claim 8, wherein the fourth instructions are also configured to:

generate the revocation list as a result of said determining.

10. The antimalware provider system of claim 9, wherein the predetermined threshold number of clients is a predetermined percentage of a total number of the clients.

11. The antimalware provider system of claim 9, further comprising sixth instructions configured to:

determine the predetermined threshold based on at least one property of the malware signature.

12. The antimalware provider system of claim 11, wherein the sixth instructions are configured to:

determine the amount of time the particular malware signature has been in circulation, and setting the predetermined threshold to be based on the amount of time.

13. The antimalware provider system of claim 8, further comprising seventh instructions configured to:

generate the signature identifiers in the signature identifier list as hashes of the malware signatures of the malware signature scan set.

14. A computer-readable program memory having computer program instructions recorded thereon that, when executed by a processing device, perform a method in an antimalware provider, the method comprising:

transmitting a malware signature scan set and a signature identifier list to a plurality of clients, the malware signature scan set including a plurality of malware signatures used to detect content infected with malware, the signature identifier list including signature identifiers for the malware signatures of the malware signature scan set, and malware being a malicious executable software program that performs a function harmful to a computer in response to executing;

receiving indications from a subset of the clients that each client of the subset of the clients manually restored content that was indicated as infected by a particular malware signature included in the malware signature set from respective quarantine storages to respective working storages, the respective quarantine storages configured to prevent execution of the content that was indicated as infected in the quarantine storage;

determining that the number of clients in the subset is greater than a predetermined threshold number of clients, the predetermined threshold number of clients being based at least on an amount of time that the particular malware signature has been in circulation;

generating a revocation list that includes a signature identifier for the particular malware signature; and transmitting the revocation list to the plurality of clients to enable quarantined content to be restored to working storage.

15. The computer-readable program memory of claim 14, wherein generating comprises:

generating the revocation list as a result of said determining.

16. The computer-readable program memory of claim 15, wherein the predetermined threshold number of clients is a predetermined percentage of a total number of the clients.

17. The computer-readable program memory of claim 15, the method further comprising:

determining the predetermined threshold based on at least one property of the malware signature.

18. The computer-readable program memory of claim 17, wherein said determining the predetermined threshold based on at least one property of the particular malware signature comprises:

determining the amount of time the particular malware signature has been in circulation, and setting the predetermined threshold to be based on the amount of time.

19. The computer-readable program memory of claim 17, wherein said determining the predetermined threshold based on at least one property of the particular malware signature comprises:

determining a generator of the particular malware signature as being an analyst or an auto-generator, and setting the predetermined threshold based on the determined generator.

20. The computer-readable program memory of claim 14, the method further comprising:

generating the signature identifiers in the signature identifier list as hashes of the malware signatures of the malware signature scan set.

* * * * *